United States Patent
Niesser et al.

(10) Patent No.: US 9,389,885 B2
(45) Date of Patent: Jul. 12, 2016

(54) METHOD AND VIRTUALIZATION SOFTWARE FOR PROVIDING INDEPENDENT TIME SOURCES FOR VIRTUAL RUNTIME ENVIRONMENTS

(71) Applicants: Otto Niesser, Allersberg (DE); Halil Caglar Ünver, Nürnberg (DE)

(72) Inventors: Otto Niesser, Allersberg (DE); Halil Caglar Ünver, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 581 days.

(21) Appl. No.: 13/627,529

(22) Filed: Sep. 26, 2012

(65) Prior Publication Data

US 2013/0125118 A1    May 16, 2013

(30) Foreign Application Priority Data

Sep. 28, 2011  (EP) .................................... 11183139

(51) Int. Cl.
   *G06F 9/455*   (2006.01)
   *G06F 1/14*    (2006.01)
   *G06F 11/16*   (2006.01)

(52) U.S. Cl.
   CPC  *G06F 9/455* (2013.01); *G06F 1/14* (2013.01); *G06F 11/1604* (2013.01); *G06F 9/45533* (2013.01); *G06F 2201/815* (2013.01)

(58) Field of Classification Search
   None
   See application file for complete search history.

(56) References Cited

U.S. PATENT DOCUMENTS

| | | |
|---|---|---|
| 7,475,002 B1 | 1/2009 | Mann |
| 2008/0172666 A1 | 7/2008 | Inoue |
| 2009/0132846 A1 | 5/2009 | Song |
| 2009/0259875 A1 | 10/2009 | Check et al. |
| 2011/0047315 A1 | 2/2011 | De Dinechin et al. |
| 2011/0252266 A1* | 10/2011 | Costa ............................ 713/500 |
| 2012/0117564 A1* | 5/2012 | Friebel et al. ..................... 718/1 |
| 2013/0046911 A1* | 2/2013 | Mine et al. .................... 710/267 |

* cited by examiner

*Primary Examiner* — Emerson Puente
*Assistant Examiner* — Zhi Chen
(74) *Attorney, Agent, or Firm* — Cozen O'Connor

(57) ABSTRACT

A method and virtualization software for providing at least two mutually independent time sources for at least one real-time operating system of a data processing device including virtual runtime environments, where a general-purpose operating system runs in one virtual runtime environment, and the virtual runtime environments are managed by virtualization software (hypervisor). A first time source is exclusively assigned to each real-time operating system, where the data processing device includes a second time source independent of the first time source, the second time source is configured to periodically generate an interrupt, the first processor core enters a routine of the virtualization software (hypervisor) with each interrupt triggered by the second time source, the content of at least one memory cell readable by the real-time operating system is updated and used as a time source, which is independent of the first time source, to control the first time source.

8 Claims, 2 Drawing Sheets

METHOD AND VIRTUALIZATION SOFTWARE FOR PROVIDING INDEPENDENT TIME SOURCES FOR VIRTUAL RUNTIME ENVIRONMENTS

BACKGROUND OF THE INVENTION

1. Field of the Invention

The invention relates to a method for providing at least two mutually independent time sources for at least one real-time operating system and to virtualization software for a data processing device having a plurality of processor cores.

2. Description of the Related Art

For automation tasks in which an increased demand is imposed on operational reliability, use is made of fail-safe automation systems in which technical measures are used to ensure that, even if individual components fail or are faulty, reliable operation is still ensured or a system or the like is changed to a safe state. An important measure for meeting such demands involves providing important operating device or components repeatedly and independently of one another, with the result that at least one fault in an individual component can be recorded. In the case of highly available systems, continued operation could also be ideally effected with the redundant replacement component.

An important resource of fail-safe automation systems shall be considered below to be a time source, i.e., a component that provides a clock, a time or a similar item of time information that is needed by an automation program or an underlying operating system to perform tasks with the correct timing, at the correct speed and in a reliable manner.

Whereas special fail-safe control devices, i.e., Fail-safe Central Processing Units (F-CPUs), or Fail-safe Programmable Logic Controllers (F-PLCs), i.e., programmable logic controllers specially provided with redundant components, are often used in the prior art, personal computers or similar standardized architectures are increasingly being provided with real-time operating systems and are being used for control and automation tasks. Even with a standard architecture, such as a personal computer, it is possible, in principle, to provide two mutually independent time sources for a real-time operating system with a corresponding reliability requirement. The important factor is that both time sources are independent of one another, i.e., they are derived from different clock sources (usually based on crystal oscillators), particularly with respect to the hardware thereof. With respect to personal computers, use is often made of a real-time clock module (RTC) on one side and a special counter of the CPU, the time-stamp counter (TSC), on the other side for this purpose. Whereas the real-time clock module obtains its clock signal from a crystal (i.e., a crystal oscillator) specially provided for this purpose, the time-stamp counter is derived from the processor clock (CPU clock) and is thus independent of the RTC clock. In this manner, it has hitherto already also been possible to provide a fail-safe automation system implemented on PC hardware or the like with two mutually independent time sources.

In the meantime, increasing use has been made of virtualization techniques in the field of control engineering. Consequently, a plurality of virtual machines each with an operating system are operated on the same hardware platform, where at least one of the operating systems is able to run under "real-time conditions" and is able to form a "fail-safe" automation component, such as a fail-safe CPU, which implemented as software. For such fields of use, it is appropriate to use a hardware platform having a plurality of processors or a plurality of processor cores, i.e., multicore CPUs, where one CPU or one processor core is able to be exclusively assigned to the virtual machine with the fail-safe real-time operating system, for example. Whereas, in such constellations, each processor or each processor core also has a time-stamp counter that is derived from the processor clock, the problem of jointly accessing resources that are present only once, especially the exemplary RTC module, arises in such "virtualized" arrangements. Although it is possible, in principle, to virtualize such a resource that is present only once, with the result that any unit ("virtualized operating system") running in a virtual machine gains access and can read an RTC module, for example, any interaction with the virtualization software, the "hypervisor", necessarily results in the execution of the requesting virtual machine being interrupted. As a result, impairment of the real-time performance occurs, in particular as a result of latency times caused thereby. This concerns, in particular, the systems in which more than one "virtualized automation system" is operated on the same hardware platform, with the result that a required resource, i.e., the clock module RTC discussed, cannot be exclusively made available to the single automation system present.

SUMMARY OF THE INVENTION

It is therefore an object of the present invention to provide a plurality of virtual machines with a central resource without accesses to this resource resulting in losses during the execution of the virtual machines.

This and other objects and advantages are achieved in accordance with the invention by providing the virtual machines with the usable information relating to a jointly used resource in a readable manner directly, i.e., without an "exit" to virtualization software, where the updating of this information is ensured by the virtualization software in an interrupt-controlled manner.

The method in accordance with the invention provides at least two mutually independent time sources for at least one real-time operating system of a data processing device with at least two virtual runtime environments, where a general-purpose operating system runs in a first of the virtual runtime environments and the real-time operating system runs in a second of the virtual runtime environments, the virtual runtime environments is managed by virtualization software, and a first processor core is assigned to the first virtual runtime environment and a second processor core is assigned to the second virtual runtime environment. Here, a first time source is exclusively assigned to the at least one real-time operating system, where the data processing device includes a second time source independent of the first time source, and the second time source is configured to periodically generate an interrupt advantageously configured in the interrupt controller as an IPI (Inter-Processor Interrupt) initialization signal or as another event to be handled separately. In this case, the first processor core with the virtual runtime environment with the general-purpose operating system is set up such that, with each interrupt triggered by the second time source, a jump is made to the virtualization software instead of the first processor core being reinitialized, as is customary after the initialization signal, for example, the content of at least one memory cell that can be read by the real-time operating system being updated by the virtualization software, and the real-time operating system using this memory cell as a time source, which is independent of the first time source, for controlling the first time source.

The described method in accordance with the invention makes it possible to simulate the second time source for the real-time operating system such that there is no need to interrupt the virtual machine with the real-time operating system to update the time source.

It is also an object of the invention to provide virtualization software for a data processing device having a plurality of processor cores, where the data processing device is provided with a general-purpose operating system and with at least one real-time operating system. Here, the virtualization software is set up to configure the data processing device for the operation of the method above-described method in accordance with the invention. The virtualization software is thus set up to update the at least one memory cell used as an independent time source after an interrupt initiated by the second time source. The advantages described with respect to the method in accordance with the invention can be achieved by such virtualization software.

A time-stamp counter of that processor core on which the second virtual runtime environment with the real-time operating system runs is advantageously used as the first time source. The advantage is, on the one hand, i.e., it is possible to read the time-stamp counter without exiting to the virtualization software (hypervisor). On the other hand, a separate time-stamp counter is available for each processor core. As a result, in the preferred architecture in which each critical runtime environment can exclusively use at least one processor core, the advantage of the time-stamp counter is exclusively available to the virtual runtime environment with the real-time operating system without being influenced by other runtime environments and other operating systems results. This is particularly advantageous when there are a plurality of real-time operating systems with a plurality of virtual environments.

A real-time clock module of the data processing device is advantageously used as the second time source. Such an RTC module is provided with a clock generator (crystal oscillator) independent of the processor clock. Here, the virtualization software advantageously performs "virtualization" of the RTC module with respect to the first virtual runtime environment. Consequently, direct accesses to the RTC module or the registers of the RTC module by the general-purpose operating system are either prevented or at least controlled by the virtualization software. Direct accesses to the RTC module or the registers of the RTC module in this manner increases the operational reliability and the reliability of the time information from the RTC module.

The peripheral interrupt controller (IO-APIC) must be "virtualized" in a similar manner. As a result, the guest operating systems are prevented from reconfiguring this module in an unauthorized manner. In addition, not all interrupt requests by this module are supposed to result in the processor core with the general-purpose operating system (core 0) changing to the context of the virtualization software and deciding there whether an interrupt is processed and, if so, the manner in which an interrupt is processed. This has the advantage, for performance, that not every interrupt results in the virtual runtime environments with the real-time operating systems being interrupted. In another advantageous embodiment, the local interrupt controllers (LO-APIC) of the processor cores may also be virtualized.

As already mentioned, a plurality of second virtual runtime environments each with a real-time operating system or each with an operating system with an increased reliability requirement ("F system"; "Fail-safe System") may be advantageously set up on the data processing device, each of these second virtual runtime environments being assigned its own processor core. As a result of the fact that each of these second virtual runtime environments has to access only one memory cell or one register as a second time source in order to adjust its own "private" first time source, such an adjustment can be performed without exiting ("VM Exit") to the virtualization software (hypervisor, VMM=Virtual Machine Monitor). The virtual machines have only read access to the memory cell or the register containing the "second item of time information". As a result, all second virtual runtime environments may use the same memory cells or registers as the second time source. However, in one advantageous embodiment, a dedicated, separate memory cell, register or the like may be managed for each of these second virtual runtime environments without significant additional outlay. As a result, it becomes possible, for example, to choose a different "display format" or a different "zero point" for each virtual runtime environment. In the simplest case, the memory cell or memory cells is/are updated by simply incrementing their content; it goes without saying that other conventions can also be selected.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the method according to the invention is explained in more detail below using the drawings. The exemplary embodiment is simultaneously used to explain virtualization software according to the invention, in which.

DETAILED DESCRIPTION OF THE PREFERRED EMBODIMENTS

Figure 1:
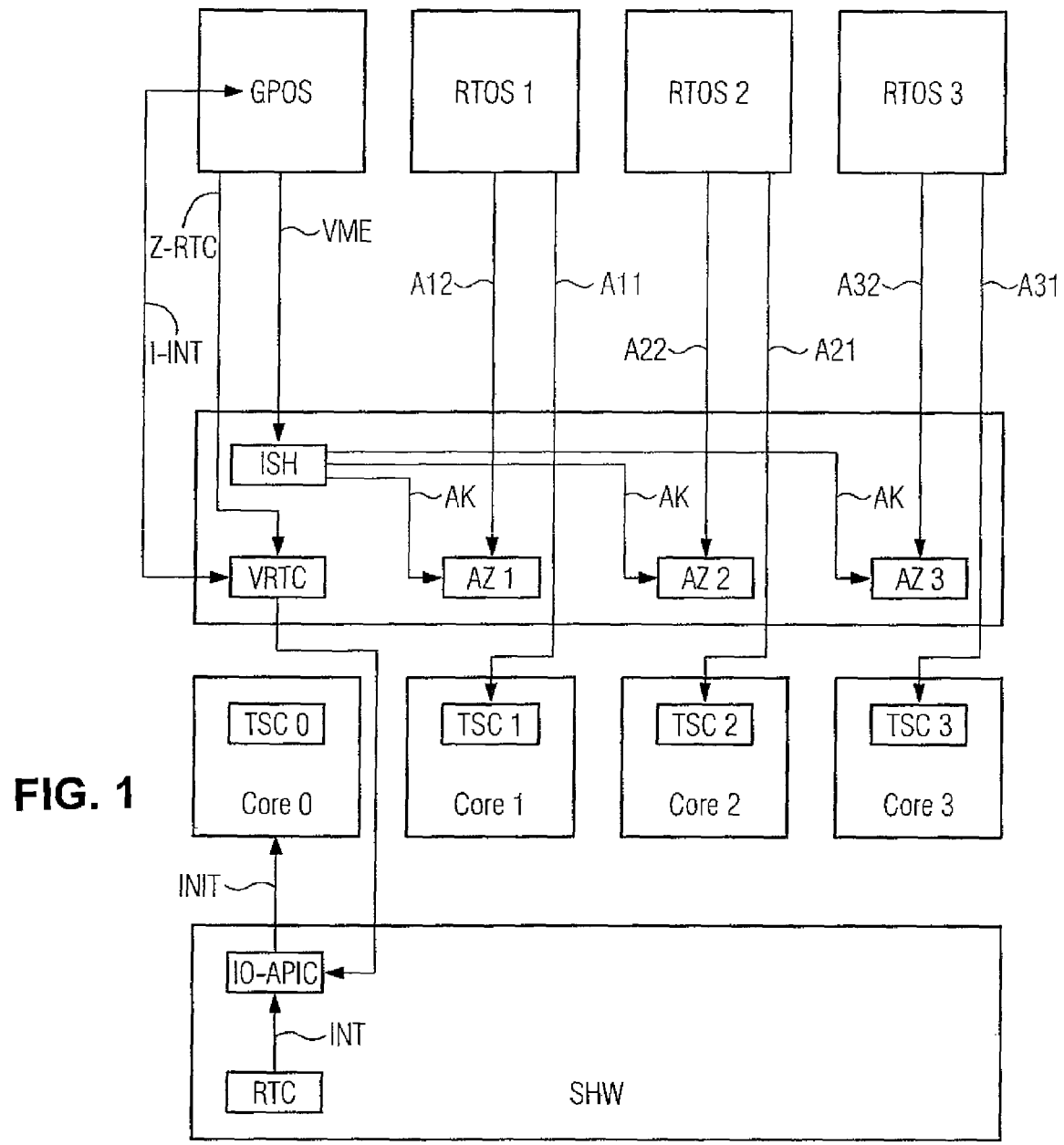
FIG. 1 is a schematic block diagram illustrating the architecture of a data processing device having a plurality of processor cores, a plurality of virtual runtime environments and a jointly used item of hardware in accordance with the invention.

FIG. 1 schematically illustrates a hardware architecture in which four processor cores Core0, . . . , Core3 are available. Virtualization software ("Virtual Machine Monitor"), referred to as "hypervisor" below, is used to generate four virtual runtime environments (virtual machines), where a general-purpose operating system GPOS, for example, Microsoft Windows or Linux, is installed in the first virtual runtime environment and is executed on the first processor core Core0. A virtual runtime environment with a respective real-time operating system RTOS1, RTOS2, RTOS3 is assigned to each of the remaining processor cores Core1, Core2, Core3. The computer architecture includes shared hardware SHW, where a real-time clock module RTC is intended to be considered here by way of exemplary. The processors or processor cores Core0, . . . , Core3 each have a time-stamp counter TSC0, . . . , TSC3 that are time counters which are fed from the processor clock. In contrast, the real-time clock module RTC includes a separate clock generator (crystal).

The method in accordance with the invention as described subsequently seeks, on the one hand, to assign the respective time-stamp counter TSC1, TSC2, TSC3 of the assigned processor core Core1, Core2, Core3 to the real-time operating systems RTOS1, RTOS2, RTOS3, where the time-stamp counters TSC1, TSC2, TSC3 are each used as a "first time source" exclusively by a respective real-time operating system RTOS1, RTOS2, RTOS3. Furthermore, the real-time clock module RTC and its time information are intended to be made available to the real-time operating systems RTOS1, RTOS2, RTOS3 as a jointly used resource without access to the time information causing the respective real-time operating system RTOS1, RTOS2, RTOS3 or the virtual runtime environments supporting the respective real-time operating system RTOS1, RTOS2, RTOS3 to exit to the hypervisor.

A High Precision Event Timer (HPET) that is likewise dependent on the processor clock and that can use the interrupt of the real-time clock module RTC in some architectures is not illustrated. It should be pointed out at this point that this HPET should likewise be "virtualized" in such architectures to prevent the interrupt assigned to the RTC module from being used by this HPET. However, this is not illustrated in the figure for reasons of clarity and is also not described any further at this point.

It should be assumed below that the general-purpose operating system GPOS requires the real-time clock module RTC as a time source, which is the case, for example, with the known operating system Microsoft Windows. As stated, the alternative use of an HPET shall not be discussed any further here. The time information that can be read from the registers of a real-time clock module RTC is not "finely granulated" enough for the requirements of the real-time operating systems RTOS1, RTOS2, RTOS3 considered here. As a consequence, a simple read of the corresponding register content cannot be used to accurately control the time information from the time-stamp counters TSC1, TSC2, TSC3. Therefore, the real-time clock module RTC is now intended to be programmed such that the real-time clock module RTC periodically triggers an interrupt INT, where the repetition accuracy of the triggering of the interrupt INT completely corresponds to the accuracy requirements. The real-time clock module RTC is initially "virtualized" with respect to the general-purpose operating system GPOS. As a result, all accesses Z-RTC to the registers of the real-time clock module RTC by the general-purpose operating system GPOS are intercepted by a corresponding entity of the hypervisor. The actual registers of the real-time clock module RTC and advantageously also the interrupt controller IO-APIC are now accessed virtually exclusively by the hypervisor. Said interrupt mechanism of the real-time clock module RTC is now parameterized in the interrupt controller IO-APIC as an initialization signal INIT or as another non-maskable interrupt, for example, as an IPI start signal. This allows interruption in the hypervisor in response to the interrupts INT generated by the real-time clock module RTC (e.g., VM Exit, Security Exception SX) without other interrupt sources having to be handled in this case. Any desired other interrupts can thus be processed by the responsible operating systems themselves, and an interrupt by the real-time clock module RTC nevertheless results in the virtual machine with the general-purpose operating system GPOS exiting (context change) to the hypervisor.

In this context, it should be ensured that the maximum processing time ("length of stay") of any desired demand on the hypervisor is shorter than the interrupt interval set in the real-time clock module RTC. This prevents a further interrupt INT having to be processed before control has been returned to the virtual machine with the general-purpose operating system GPOS. It should be pointed out here that the hypervisor is executed on the first processor core Core0 such that the interrupt-dictated exit VME to the hypervisor (VM Exit, Security Exception SX) or to the service routine ISH (initialization signal handler) there occurs without influencing the other virtual machines with the real-time operating systems RTOS1, RTOS2, RTOS3.

The hypervisor assigns respective memory cells AZ1, AZ2, AZ3 ("alternative time sources") or registers to the real-time operating systems RTOS1, RTOS2, RTOS3, which memory cells or registers are used as a second time source for these real-time operating systems RTOS1, RTOS2, RTOS3. The contents of these memory cells AZ1, AZ2, AZ3 or registers are updated by the hypervisor or the service routine ISH there with each interrupt INT generated or triggered by the real-time clock module RTC and the initialization signal produced thereby, such as by incrementing a numerical value in these memory cells AZ1, AZ2, AZ3 or registers. The second time sources produced in this manner can be used at any time by read access A12, A22, A32 to these memory cells AZ1, AZ2, AZ3 or registers. The first time sources TSC1, TSC2, TSC3 are adjusted, for example, by reading A11, A21, A31 these registers in real-time and comparing them with the numerical values in the memory cells AZ1, AZ2, AZ3 or the incremented registers used.

The previously described parameterization of the interrupt controller with respect to the clock module interrupt INT requires this controller to be virtualized with respect to the general-purpose operating system GPOS in many cases. If the general-purpose operating system GPOS uses the (now virtualized) real-time clock module VRTC as the time source, an RTC interrupt I-INT generated by a virtualized clock module VRTC is "injected" into the general-purpose operating system GPOS (for example, by interrupt injection or by an inter-processor interrupt by the local interrupt module LO-APIC) when handling the initialization signal on the basis of the required clock. In order to increase the processing performance, it is possible to parameterize the general-purpose operating system GPOS such that the otherwise required acknowledgement of the RTC interrupt I-INT is omitted.

In some processors, the initialization signal cannot be delivered during the runtime of the hypervisor, i.e., during a "VM Exit". This implies, for example, the maximum "residence time" (as previously described) which, as described, must be considerably shorter than the selected RTC clock. When shutting down the general-purpose operating system GPOS, states in which the assigned virtual machine scarcely has to be executed or does not have to be executed at all any longer may arise. As a result, the assigned processor core Core0 permanently executes the context of the hypervisor and an initialization signal therefore cannot be delivered. In such cases, a boot operating system or comparable software can be started in the corresponding virtual machine (virtual runtime environment), with the result that the hypervisor can or has to be accordingly left.

Figure 2:
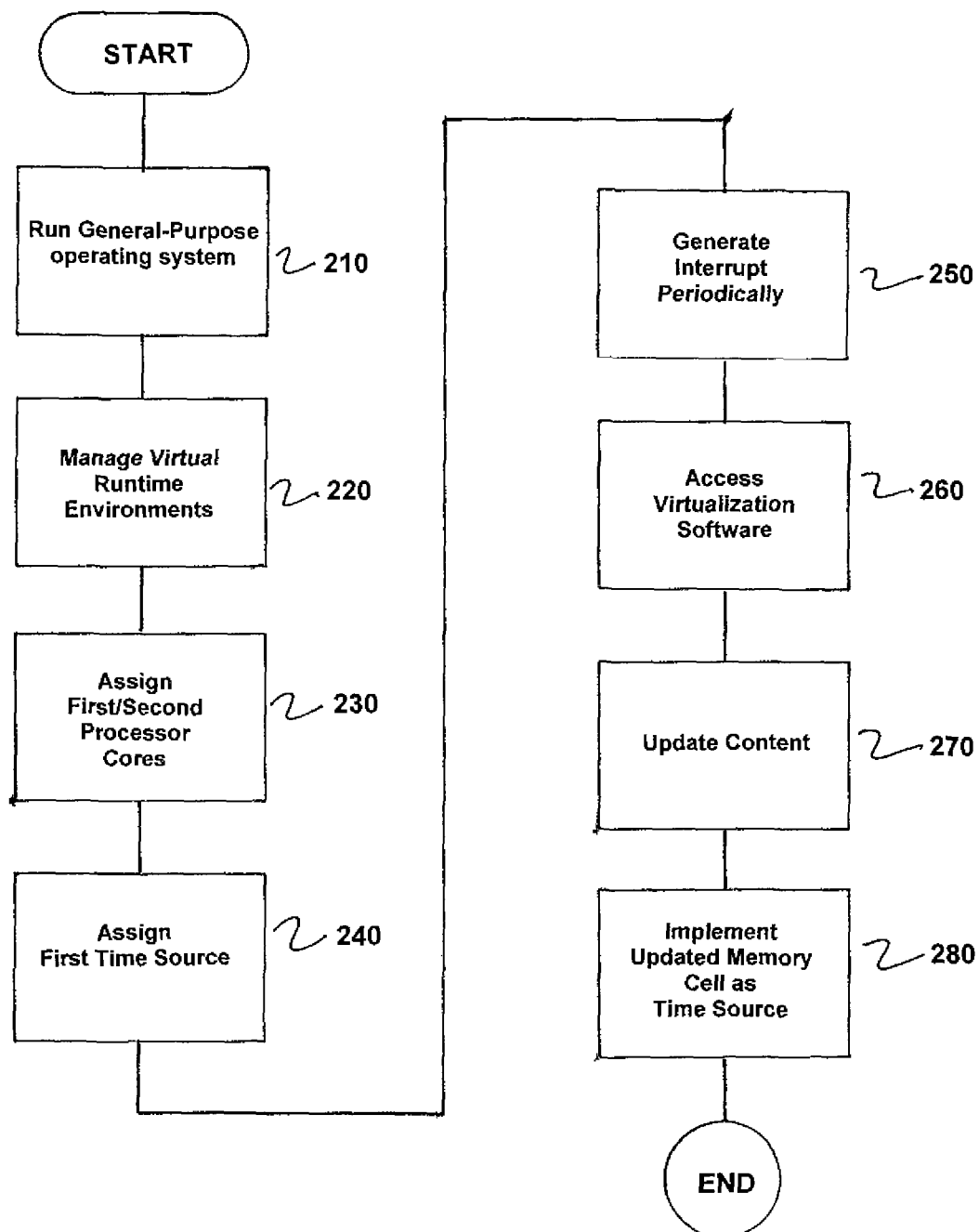
FIG. 2 is a flowchart of the method in accordance with an embodiment of the invention.

FIG. 2 is a flowchart of a method for providing at least two mutually independent time sources for at least one real-time operating system of a data processing device with a plurality of virtual runtime environments. The method comprises running a general-purpose operating system in a first virtual runtime environment of the plurality of virtual runtime environments and running the at least one real-time operating system in a second virtual runtime environment of the plurality of virtual runtime environments, as indicated in step 210.

The plurality of virtual runtime environments are then managed by virtualization software, as indicated in step 220. A first processor core is assigned to the first virtual runtime environment and a second processor core is assigned to the second virtual runtime environment, as indicated in step 230.

Next, a first time source is assigned exclusively to the at least one real-time operating system, as indicated in step 240. Here, the data processing device includes a second time source that is independent of the first time source. An interrupt is generated periodically by the second time source, as indicated in step 250.

With each interrupt triggered by the second time source, the virtualization software is accessed by the first processor core assigned to the first virtual runtime environment including the general-purpose operating system of the plurality of virtual runtime environments, as indicated in step 260.

The content of at least one memory cell, which is readable by the at least one real-time operating system, is updated by the virtualization software, as indicated in step 270. The updated at least one memory cell is then implemented by the real-time operating system as a time source that is independent of the first time source, as indicated in step 280.

While there have been shown, described and pointed out fundamental novel features of the invention as applied to a preferred embodiment thereof, it will be understood that various omissions and substitutions and changes in the form and details of the methods and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for providing at least two mutually independent time sources for at least one real-time operating system of a data processing device with a plurality of virtual runtime environments, the method comprising the steps of:

running a general-purpose operating system in a first virtual runtime environment of the plurality of virtual runtime environments and the at least one real-time operating system running in a second virtual runtime environment of the plurality of virtual runtime environments;

managing the plurality of virtual runtime environments by virtualization software;

assigning a first processor core to the first virtual runtime environment and assigning a second processor core to the second virtual runtime environment;

assigning a first time source exclusively to the at least one real-time operating system, the data processing device including a second time source independent of the first time source, the second time source being configured to periodically generate an interrupt comprising one of an initialization signal, a start signal or a non-maskable interrupt;

generating periodically, by the second time source, an interrupt;

accessing, by the first processor core assigned to the first virtual runtime environment including the general-purpose operating system of the plurality of virtual runtime environments, the virtualization software with each interrupt triggered by the second time source;

updating, by the virtualization software, a content of at least one memory cell which is readable by the at least one real-time operating system; and implementing, by the real-time operating system, the updated at least one memory cell as a time source which is independent of the first time source.

2. The method as claimed in claim 1, wherein the first time source comprises a time-stamp counter of that processor core on which the second virtual runtime environment with the at least one real-time operating system runs.

3. The method as claimed in claim 1, wherein the second time source comprises a real-time clock module of the data processing device.

4. The method as claimed in patent claim 3, wherein the real-time clock module with respect to the first virtual runtime environment is virtualized by the virtualization software.

5. The method as claimed in claim 1, wherein at least one interrupt controller with respect to the general-purpose operating system is virtualized by the virtualization software.

6. The method as claimed in claim 1, wherein a plurality of second virtual runtime environments each including a real-time operating system are set up on the data processing device, each of the plurality of second virtual runtime environments being assigned a processor core.

7. The method as claimed in patent claim 6, further comprising the step of:

updating at least one separate memory cell respectively for each second virtual runtime environment.

8. The method as claimed in claim 1, wherein the virtualization software updates content of the at least one memory cell, which is readable by the real-time operating system, by incrementing a numerical value stored in the at least one memory cell.

* * * * *